Oct. 19, 1943.                W. P. SHEPHERD                2,332,117
                            COOKING GRID OR SHELF
                             Filed Oct. 2, 1940
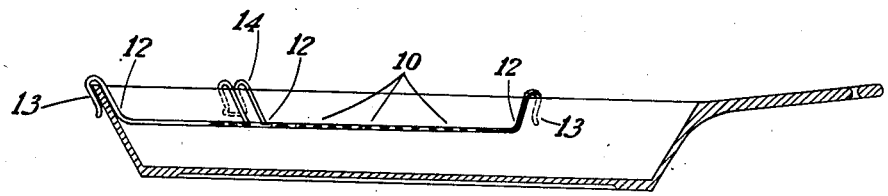
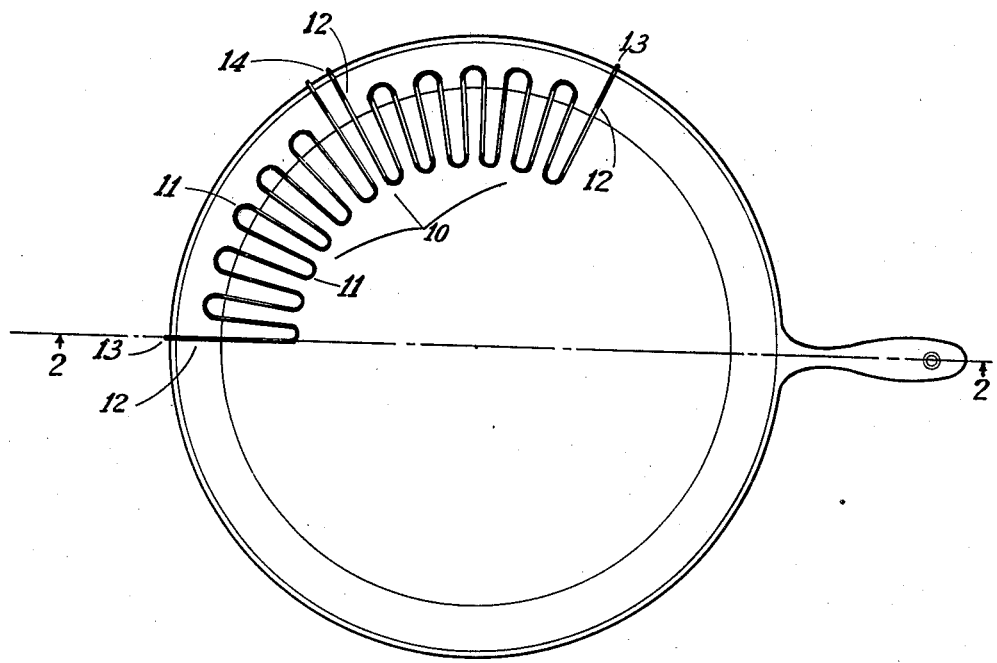
Winfred P. Shepherd, INVENTOR Patented Oct. 19, 1943

2,332,117

UNITED STATES PATENT OFFICE 2,332,117

COOKING GRID OR SHELF

Winfred P. Shepherd, Pasadena, Calif.

Application October 2, 1940, Serial No. 359,444

1 Claim. (Cl. 53—7)

My invention relates to a grid or shelf for use in frying pans, designed to be readily applied and, in the preferable form thereof, adjustable in shape to fit pans of various shapes and sizes.

The object of my invention is to provide a ledge or shelf above the bottom of the frying pan and adjacent the side thereof, on which bacon or other cooked material may be placed to keep it warm and to permit any surplus grease to drain therefrom.

Referring to the accompanying drawing:

Fig. 1 is a plan view of a frying pan, with the grid or shelf hooked over the rim of the pan.

Fig. 2 is a sectional view of the frying pan, showing the grid in place, suspended above the bottom of said pan, the section being taken along the line 2—2, as indicated.

The grid or shelf of my invention, herein generally designated by the numeral 10, preferably comprises a strand, preferably of wire, bent to form a plurality of loops 11 in substantially the same plane, adjacent loops extending in opposite directions, as shown. Adjacent the ends of the grid 10 and preferably at one or more points therealong, the wire is preferably bent upward, as at 12, to form hooks 13 which are adapted to hook over the edge or rim of a frying pan to support the grid on the pan. When so placed in a frying pan, the loops 11 form an approximately horizontal ledge along the side of the pan at an elevation above the bottom of the pan. The natural flexibility of the grid permits it to conform to pans of various shapes or sizes.

In use, the grid 10 is simply flexed to conform to the side of the pan and the hooks 13 are then hooked over the rim. Bacon or other material may be cooked on the entire bottom of the pan and when so cooked, may be placed on the said ledge to keep the food so cooked warm and to permit surplus grease to drain directly back into the frying pan. The grid or shelf 10 may be removed from the pan by simply lifting the hooks 13 off the rim of the pan.

It may be desirable, in some cases, to make the shelf in the form of a stamping out of sheet metal, in which case the adjustable feature above described might be lacking, but the other functions thereof would be the same.

I claim as my invention:

A frying pan drain shelf comprising a length of wire formed into a series of alternate loops and adapted to be flexed into a segment of an annulus for positioning against the inner face of the side wall of the pan so as to conform therewith in curvature, and a plurality of integral hooks extending upwardly from the pan-engaging edge of said shelf for engagement with the upper edge of the pan to hold the shelf in its flexed, pan-engaging position.

WINFRED P. SHEPHERD.